United States Patent [19]

Rief et al.

[11] Patent Number: 5,799,259
[45] Date of Patent: Aug. 25, 1998

[54] VEHICLE WITH STEERABLE FRONT AND REAR WHEELS

[75] Inventors: Klaus Rief, Leinzell; Dieter Elser, Essingen; Walter Kogel, Abtsgmünd, all of Germany

[73] Assignee: ZF Friedrichshafen AG, Friedrichshafen, Germany

[21] Appl. No.: 649,622

[22] PCT Filed: Dec. 2, 1994

[86] PCT No.: PCT/EP94/04010

§ 371 Date: Jul. 11, 1996

§ 102(e) Date: Jul. 11, 1996

[87] PCT Pub. No.: WO95/15879

PCT Pub. Date: Jun. 15, 1995

[30] Foreign Application Priority Data

Dec. 7, 1993 [DE] Germany ............... 43 41636.5

[51] Int. Cl.⁶ .............. G06G 7/76; B62D 61/10
[52] U.S. Cl. .............. 701/41; 701/42; 701/36; 180/412; 180/415; 280/707
[58] Field of Search .............. 364/423.98, 424.051, 364/424.052, 424.053, 424.054, 424.055; 180/24.01, 4.5, 6.2, 6.28, 6.48, 422, 414, 236, 409, 234, 410, 412; 280/275, 283, 663, 277, 691, 707; 701/36, 41, 42

[56] References Cited

U.S. PATENT DOCUMENTS

| | | | |
|---|---|---|---|
| 4,625,822 | 12/1986 | Nakamura et al. | 180/415 |
| 4,660,844 | 4/1987 | Yamamoto et al. | 280/91 |
| 4,697,816 | 10/1987 | Kawamoto et al. | 180/409 |
| 4,700,960 | 10/1987 | Miki et al. | 180/414 |
| 4,705,135 | 11/1987 | Kawamoto et al. | 364/424.051 |
| 4,716,981 | 1/1988 | Murao | 180/412 |
| 4,720,790 | 1/1988 | Miki et al. | 364/424.051 |
| 4,778,023 | 10/1988 | Sugasawa | 180/415 |
| 4,884,647 | 12/1989 | Mimuro et al. | 364/424.051 |
| 4,902,028 | 2/1990 | Seizawa et al. | 180/409 |
| 4,926,954 | 5/1990 | Ataka et al. | 364/424.051 |
| 5,003,480 | 3/1991 | Mori et al. | 364/424.052 |
| 5,020,619 | 6/1991 | Kanazawa et al. | 364/424.051 |
| 5,047,939 | 9/1991 | Ito et al. | 364/424.051 |
| 5,088,573 | 2/1992 | Moll | 180/140 |
| 5,094,127 | 3/1992 | Ishida et al. | 477/108 |
| 5,105,899 | 4/1992 | Mori et al. | 364/424.051 |
| 5,180,026 | 1/1993 | Mori | 364/424.052 |
| 5,208,751 | 5/1993 | Berkefeld | 364/424.051 |
| 5,295,550 | 3/1994 | Chikuma | 180/412 |
| 5,430,650 | 7/1995 | Susuki et al. | 364/424.052 |

*Primary Examiner*—Jacques Louis-Jacques
*Attorney, Agent, or Firm*—Larson & Taylor

[57] ABSTRACT

The present invention relates to a method for steering a vehicle (1) with steerable front and rear wheels (2, 3), in which the angle ($\beta$) of the rear wheels (3) is set as a function of the steering angle ($\alpha$) of the front wheels (2) and other parameters. The displacement of the rear wheels (3) during start-up and steering out of forward travel follows the steering movement of the front wheels (2) with a time delay. Such a steering characteristic prevents a corner (5) of the rear of the vehicle which is on the outside of the turn from running over a laterally placed obstacle, for example a curb, when starting up.

8 Claims, 2 Drawing Sheets

VEHICLE WITH STEERABLE FRONT AND REAR WHEELS

BACKGROUND OF THE INVENTION

1. Field of the Invention

The invention relates to a vehicle with steerable front and rear wheels. The steering angle of the rear wheels of such vehicles is set as a function of the steering angle of the front wheels and of further parameters.

2. Description of the Prior Art

At low speeds during forward travel, the rear wheels are angled opposite the front wheels in order to increase the maneuverability of the vehicle by decreasing the diameter of the turning circle. In vehicles with long wheel bases, particularly with buses, the rear of the vehicle swings out far. It is possible for the rear wheels to run over the curb when starting from a bus stop. Obstacles can be caught by the rear of the vehicle.

Because of these problems it has been proposed in connection with a known vehicle (DE-C2-35 06 048) to gradually adapt the angle of steering lock of the rear wheels as a function of the distance traveled by the vehicle to the set value determined by the steering angle of the front wheels.

It is the object of the invention to further improve the steering characteristics of a known vehicle.

SUMMARY OF THE INVENTION

This object is attained in the vehicle wherein displacement of the rear wheels when starting and steering out of forward travel follows the steering movement of the front wheels with a time delay. By means of this it is assured that the rear of the vehicle initially moves almost parallel in respect to a curb or other obstacle. The rear wheel at the outside of the turn moves inside the path of travel of the front wheel at the outside of the turn. In this way the rear wheel on the outside of the turn cannot run over an obstacle with which the front wheel on the outside of the turn should already have collided.

Practical and advantageous embodiments of the invention ensue from the dependent claims.

The time delay in displacing the rear wheels in respect to the steering movement of the front wheels is fixed in such a way that the delay is greater at low vehicle speeds than at high vehicle speeds and equals zero above a limit value of 20 km/h, for example. This results in advantages in running dynamics, such as an immediate increase in lateral force during running speeds above the limit value.

With a vehicle intended for right-hand traffic it suffices to set the time delay only in connection with a steering angle in the direction of a left turn. For example, with a bus, the bus stop is always approached from only one side, i.e. only on this side can the curb or an obstacle be run over when leaving the bus stop. A small loss in maneuverability at low running speeds can be accepted in left turns, since left turns are always made in the outside lane of the curve, i.e. in the lane with the greater radius. With vehicles intended for left-hand traffic this characteristic is provided in a reversed sense.

The control and regulating device for steering the rear wheels can be simplified in that the time delay only takes place during forward travel and not during travel in reverse.

The invention will be explained in detail below by means of an exemplary embodiment represented in the drawings.

DETAILED DESCRIPTION OF THE PREFERRED EMBODIMENTS

Figure 1:
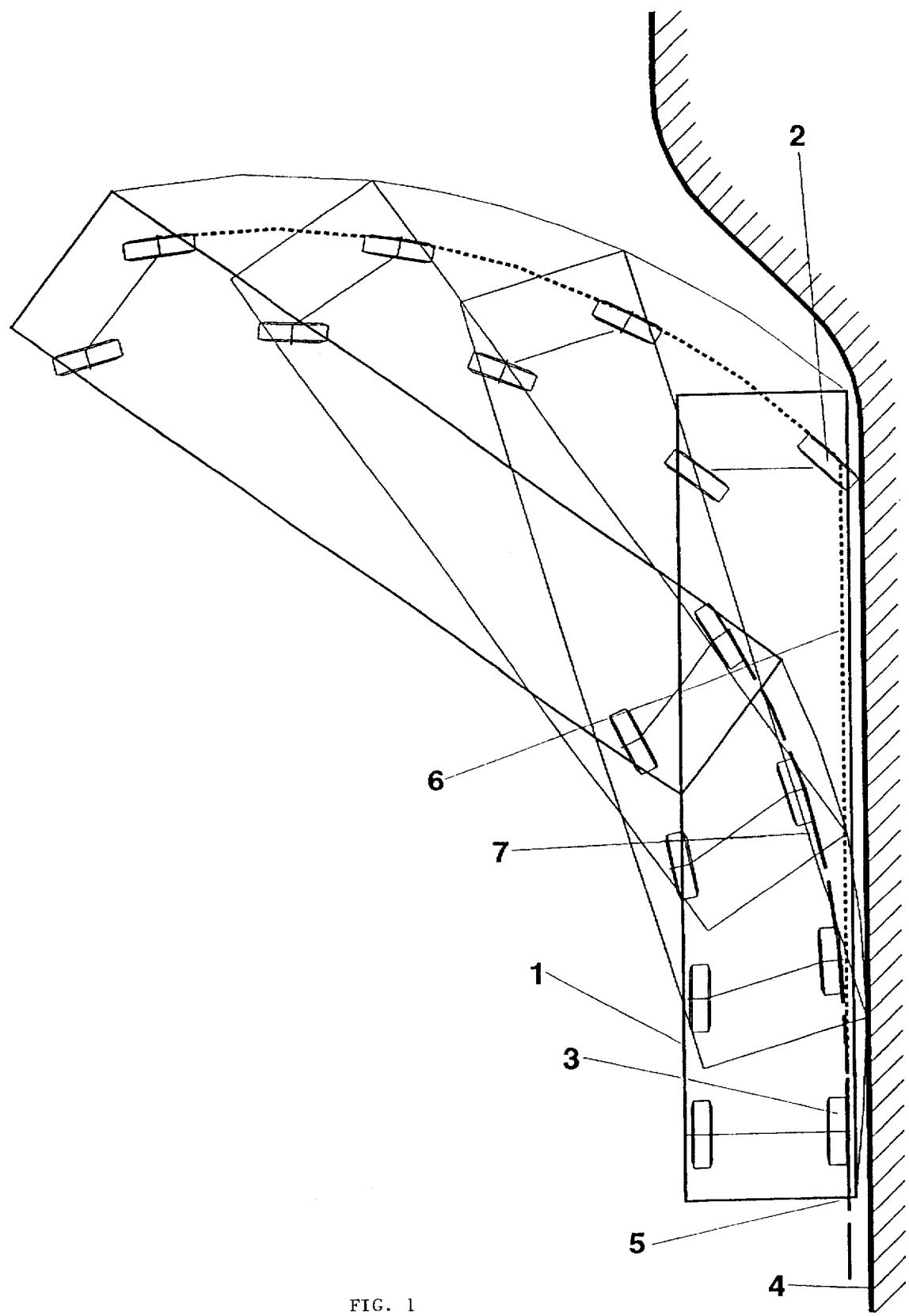
FIG. 1 shows a steering process of the vehicle with several positions of the vehicle.

FIG. 1 show a schematically represented vehicle 1 having steerable front wheels 2 and steerable rear wheels 3. The vehicle is shown in several positions during a steering process. In the initial position the vehicle is parallel with a linear lateral boundary line 4, for example a curb or a wall. In this position as well as in the end position shown, the outer contour of the vehicle is represented by heavy lines.

When moving away from the boundary line 4, initially the front wheels 2 alone are angled. Taking into consideration the starting speed, the rear wheels 3 are only angled after a time delay, i.e. after a defined time interval, and opposite to the front wheels 2. Because of this a corner 5 of the rear of the vehicle on the outside of the turn moves almost parallel with the boundary line 4. The rear of the vehicle moves away from the boundary line 4 only at the end of the time interval.

In connection with generally known vehicles with steerable front and rear wheels, the association of the wheel angle $\alpha$ of the front wheels in respect to the wheel angle $\beta$ of the rear wheels and as a function of the travel speed v follows the equation $$\beta = f(v) \times \alpha.$$

Figure 2:
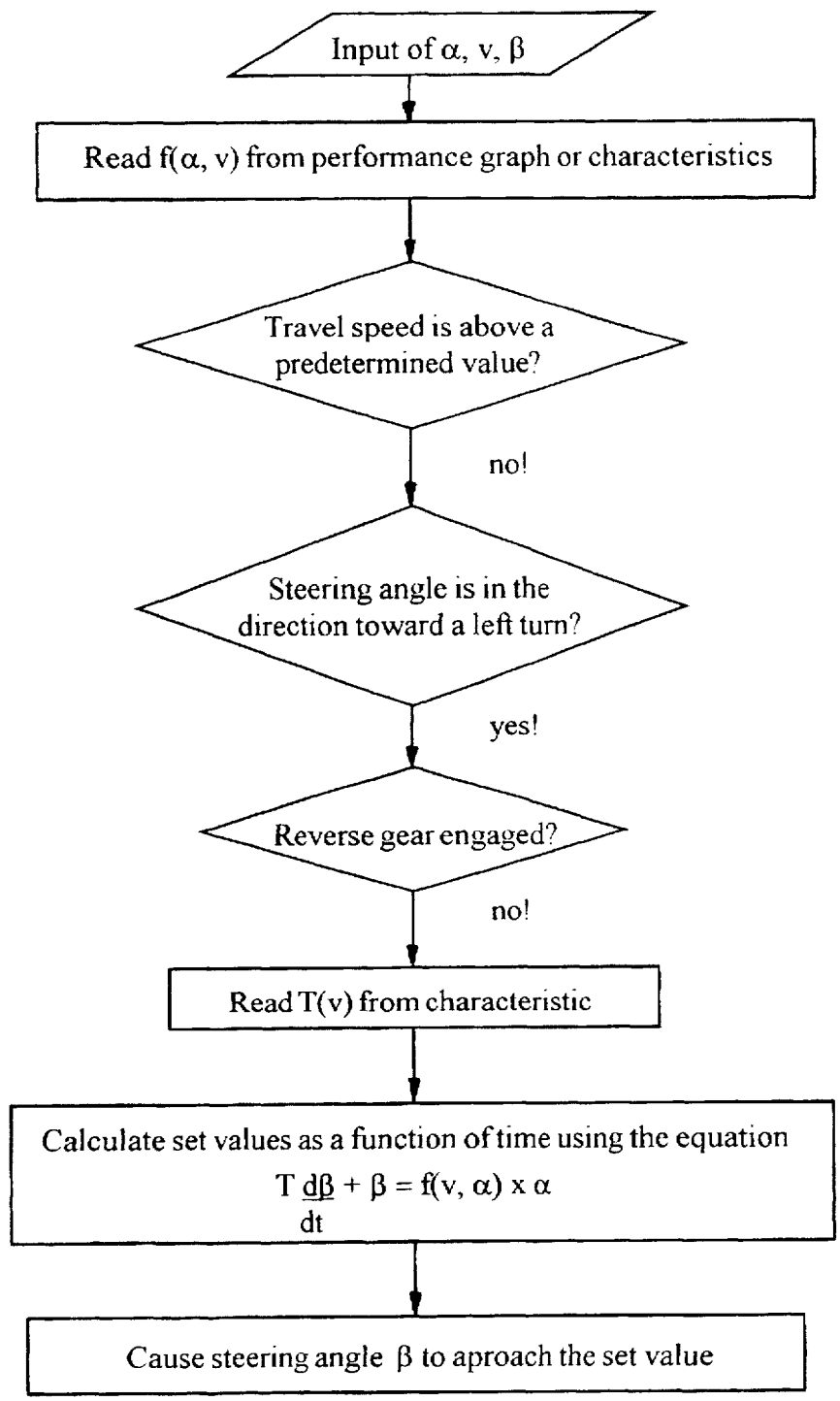
FIG. 2 shows a flow chart diagram of a preferred method in accordance with the present invention.

In connection with the vehicle in accordance with the invention, FIG. 2 depicts a flow chart diagram in which the association of the wheel angle $\alpha$ of the front wheels 2 to the wheel angle $\beta$ of the rear wheels 3 follows with delay the equation $$T \frac{d\beta}{dt} + \beta = f(v, \alpha) \times \alpha \qquad \text{1st order delay}$$

In this case f(v, $\alpha$) is the association of the performance characteristics as a function of the traveling speed v and the wheel angle $\alpha$ of the front wheels; T is the time constant. The time constant T is selected, depending on the driving situation and driving status, as a function of various parameters, in particular of:

the speed v, the direction of angle of the front wheels, the direction of travel, the wheel base of the vehicle, the length of the vehicle, and the ratio of the maximum steering angles of the front and rear wheels.

The problem of the swinging out of the rear of the vehicle occurs in particular during passing of or moving away from obstacles, such as the boundary line 4 mentioned, at low speeds. For this reason it is practical to provide the time delay by means of the time constant T in its full amount only within the range of low vehicle speeds. With increasing vehicle speed the time constant T is reduced until finally it equals zero starting at a defined limit value, for example starting at 20 km/h.

With vehicles which approach a defined boundary line always from only one side, such as buses at bus stops, it is necessary to take this problem of the swinging rear into consideration only on this side. Thus, with a vehicle intended for right-hand traffic, this time delay by means of the time constant T need only be provided in case of a steering angle in the direction towards a left turn. The time constant T can be zero in case of a steering angle towards a right turn. These relationships are selected in the opposite way with vehicles intended for left-hand traffic.

These matters are similar during forward and reverse travel. In this case, the time constant can be selected to be very small or even equal to zero during travel in reverse. A driving characteristic the same as with conventional, all-wheel drive vehicles is achieved in this case.

The problem of the swinging rear only occurs when the rear wheels 3 are angled, i.e. when angled out of the forward position. This problem does not occur when the rear wheels are angled back into the forward position. The safe state of the neutral position in the forward travel position is always approached in the course of this. The time constant T can therefore be zero during reverse steering.

The track of the front wheel 2 at the outside of the turn is marked by a line 6 of short dashes. The track of the rear wheel 3 at the outside of the turn is marked by a line 7 of long dashes. The marking of these two lines 6 and 7 makes it clear that the track of the rear wheel 3 at the outside of the turn always lies inside the track of the front wheel 2 on the outside of the turn.

The selection of the time constant T as a function of the vehicle-specific parameters of vehicle wheel base, vehicle length, ratio of the maximum steering angles of the front and rear wheels 2, 3 makes an adaptation to various vehicle dimensions possible.

The time delay can be coupled to the occurrence of defined events. For example, in connection with a bus it is possible to initiate the time delay only when the doors are opened while moving into a bus stop. This is a signal that during the subsequent start the bus will be moving out of the bus stop.

We claim:

1. A method for steering a vehicle (1) with steerable front wheels (2) having a steering angle ($\alpha$) and steerable rear wheels (3) having a steering angle ($\beta$), the method comprising the steps of setting the steering angle ($\beta$) of the rear wheels (3) at least as a function of the steering angle ($\alpha$) of the front wheels (2) and displacing the rear wheels (3) at the initiation of forward travel to follow the steering movement of the front wheels (2) with a time delay, calculating intermediate set values as a function of time using the equation $$T\frac{d\beta}{dt} + \beta = f(v, \alpha) \times \alpha$$

wherein T is the time constant and v is the speed, and causing the steering angle B of the rear wheels (3) to approach a kinematic set value using the calculated intermediate set values, so that the rear wheels (3) do not move beyond a predetermined track.

2. The method in accordance with claim 1, wherein the time delay at low travel speeds is greater than the time delay at high travel speeds.

3. The method in accordance with claim 2, wherein the time delay equals zero at travel speeds above a predefined value.

4. The method in accordance with claim 1, wherein in a vehicle (1) intended for right-hand traffic, the time delay only occurs when at least one steering angle ($\alpha$, $\beta$) is in the direction toward a left turn, and the time delay is zero when at least one steering angle ($\alpha$, $\beta$) is in the direction toward a right turn.

5. The method in accordance with claim 1, wherein the time delay occurs only during forward travel and the time delay is zero during reverse travel.

6. The method in accordance with claim 1, wherein the time delay is also a function of at least one parameter selected from the group consisting of a vehicle wheel base, a vehicle length, and a ratio of maximum steering angles ($\alpha$, $\beta$) of the front and rear wheels (2, 3).

7. The method in accordance with claim 1, wherein the time delay is coupled to the occurrence of at least one predefined event.

8. The method in accordance with claim 7, wherein the time delay is coupled to actuation of doors of a bus.

* * * * *